Figure 1:
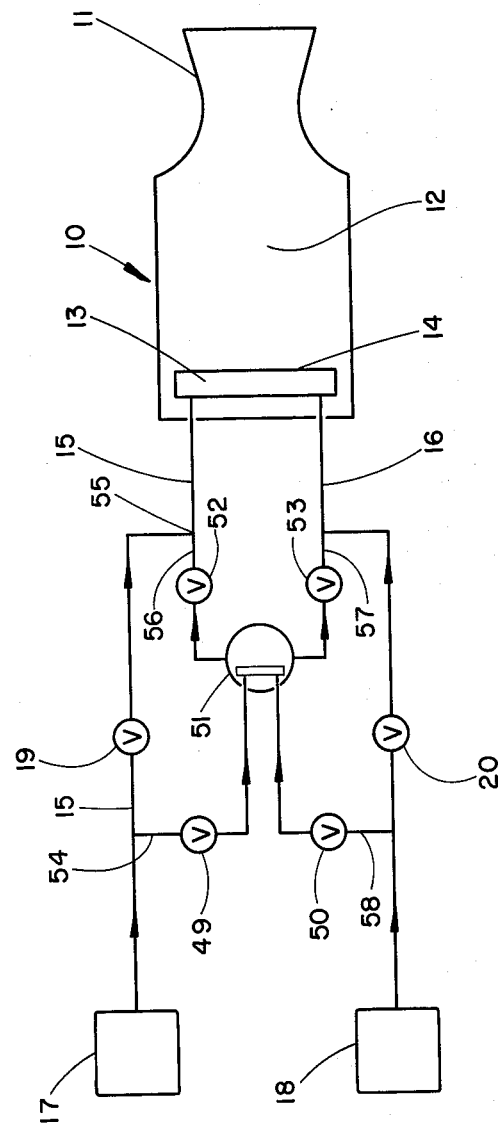

June 28, 1966 D. S. GOALWIN 3,257,799
METHOD FOR AERATION OF LIQUID PROPELLANTS
Filed Feb. 1, 1963 3 Sheets-Sheet 1

INVENTOR.

June 28, 1966    D. S. GOALWIN    3,257,799
METHOD FOR AERATION OF LIQUID PROPELLANTS
Filed Feb. 1, 1963    3 Sheets-Sheet 2

INVENTOR.
Daniel S. Goalwin

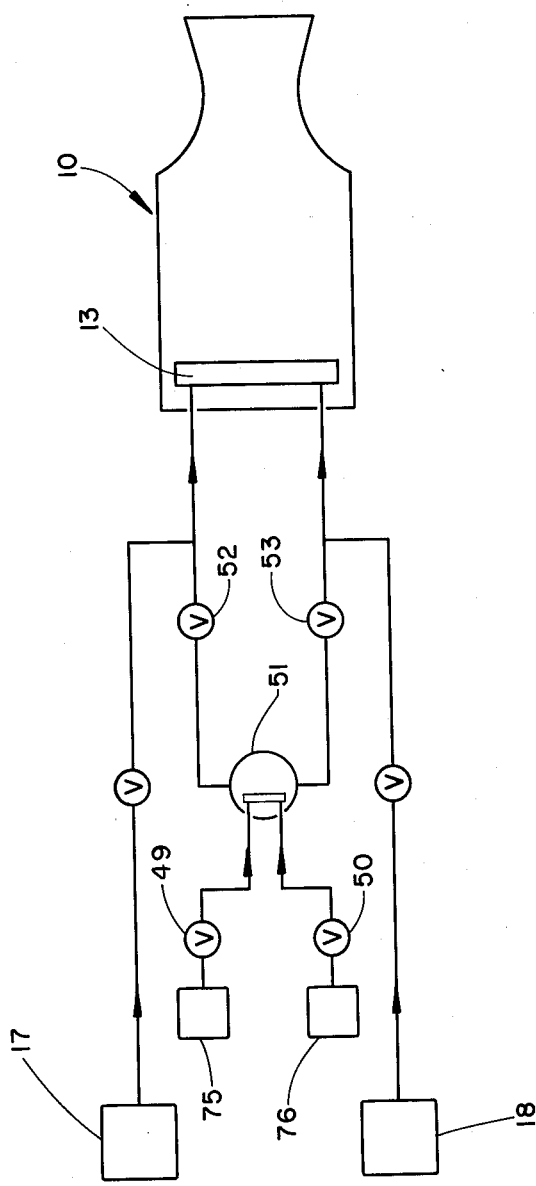

3,257,799
METHOD FOR AERATION OF LIQUID PROPELLANTS

Daniel S. Goalwin, Los Altos, Calif., assignor to United Aircraft Corporation, East Hartford, Conn., a corporation of Delaware
Filed Feb. 1, 1963, Ser. No. 255,457
6 Claims. (Cl. 60—35.3)

The present invention relates to a method for controllably varying the bulk density of liquid propellants flowing to a reaction motor combustion chamber and more particularly to a method of controllably effecting a wide range of thrust requirements in liquid and hybrid reaction motor systems.

In the use of reaction motors, it is often desirable to modulate or vary the thrust of the motor in a smooth and continuous manner. For example, the undertaking of space maneuvers such as trajectory or orbital correction imposes exacting requirements on the thrust control of the engine. In the future, space missions such as orbital rendezvous and lunar landings will call for precise and accurate vehicle control necessitating, therefore, propulsion systems having highly reliable thrust variability. Current practice for varying thrust output of liquid or hybrid engines calls for modulating the mass rate of flow of the liquid propellant entering the combustion chamber by either controlling the injector port area or the injection pressure or both. However, variable area injectors are inherently complex and, because of their susceptibility to heating at the injector face, are confronted with serious reliability problems. Moreover, a system relying on variations of injection pressures to modulate the thrust level results in unstable mixing with a resultant decrease in combustion performance.

More recently, an improved system for controlling the mass rate of flow of a liquid propellant flowing to a combustion chamber has been proposed. This system calls for the injection of an inert gas into the feed lines of the liquid propellant in order to vary the bulk density of the propellant and, consequently, the thrust level of the reaction motor. However, carrying an inert gas for dilution of the propellant has the disadvantage of reducing the vehicle payload without adding to its thrust capability. Further, the employment of systems dependent upon a source of inert gas for aeration requires the carrying of a substantial surplus of gas in the event situations arise where sustained low thrust is necessary. Alternatively, in a system where the liquid propellant storage tanks are pressurized by an inert gas from a common source and the same inert gas is tapped for aeration purposes, the danger exists that sustained low-level thrust will deplete the gas source which is needed for pressurizing the propellant storage tanks. In such an instance, the vehicle would be in the unfortunate position of having substantial quantities of propellant in the storage tanks but no way of impelling the propellants into the combustion chamber.

The general purpose of this invention is to provide a method for accurately and continuously varying the thrust level of a liquid or hybrid reaction motor over a wide range which embraces all of the advantages of similarly employed methods and devices and possesses none of the aforesaid disadvantages. To attain this, the present invention constitutes, basically, a method for selectively and continuously regulating the mass rate of flow of the propellant as it passes through its feed lines by injecting therein gaseous combustion products to reduce the bulk density of the propellant.

An object, therefore, of the present invention is to provide a method for aeration throttling of liquid propellant reaction motors by injecting gaseous combustion products into the propellant.

A further object is to provide a thrust modulation system employing a two-phase flow of propellant and combustion products.

Another object is to provide a method for thrust modulation which is continuously variable.

Another object is the provision of a method for thrust modulation which realizes high injection velocity over a wide thrust range.

A further object is to provide a method for thrust modulation which does not require a source of additional high pressure gas for aeration.

A further object is to provide a method of thrust modulation which insures stable combustion and high combustion performance.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIGS. 1 and 3 diagrammatically depict preferred embodiments of systems employing a single gas generator or precombustion chambers.

Figure 2:
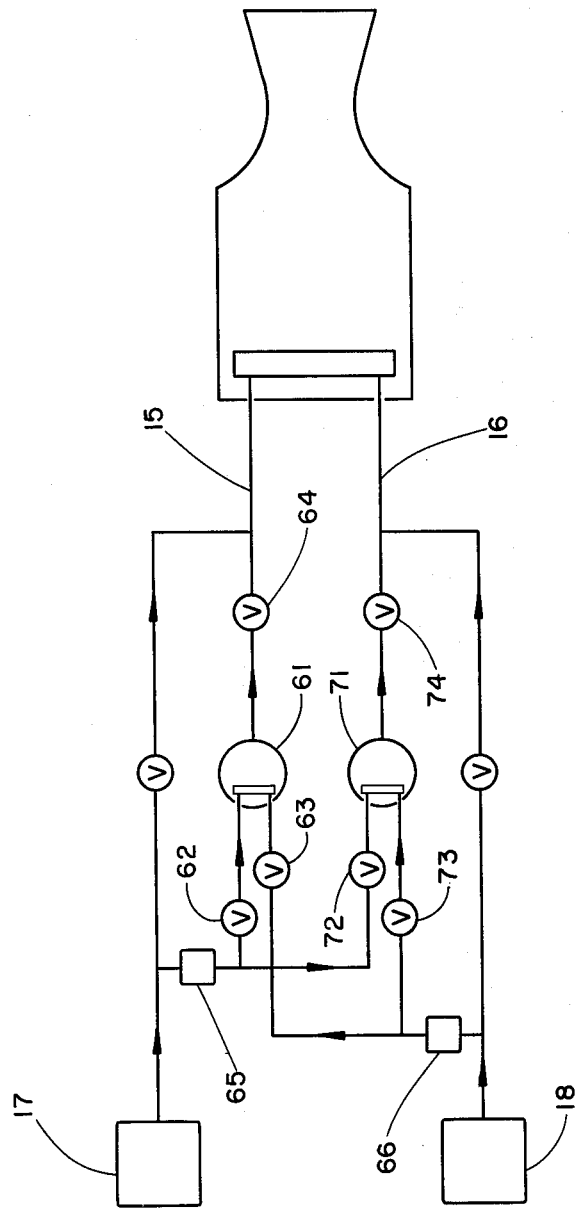

FIG. 2 diagrammatically depicts a typical system using a plurality of gas generators or precombustion chambers.

In FIG. 1 is a system employing a conventional rocket engine thrust chamber 10 comprised of a nozzle 11, a combustion chamber 12, and an injector 13. The injector 13 has a face 14 with separate orifices for the separate injection of a liquid fuel and a liquid oxidizer which react in the combustion chamber to produce a high temperature working fluid to propel the rocket system. To provide injector 13 with the liquid fuel and oxidant, feed lines 15 and 16, respectively, are connected between a fuel storage tank 17 and an oxidant storage tank 18. The fuel and oxidant may be caused to flow into lines 15 and 16 by any number of devices not shown in the drawing such as pressurizing storage tanks 17 and 18 with gas or, alternatively, by placing feed pumps in lines 15 and 16. An example of a preferred bi-propellant system constitutes hydrazine as a fuel which is stored in tank 17 and nitrogen tetroxide as an oxidant which is stored in tank 18.

In accordance with the method of operation of the present invention, valve 19 is opened to admit hydrazine from tank 17 through line 15 into the injector 13 and valve 20 is opened to flow nitrogen tetroxide from tank 18 through line 16 into the injector 13 where both the fuel and oxidant are injected into the combustion chamber 12 for ignition and combustion. Assuming that the thrust engine is now performing at its maximum thrust level and it becomes necessary to reduce the thrust level, the present invention reduces the mass rate of flow of the propellants in the feed lines by reducing the bulk density of the propellants they contain. This is accomplished by aerating the propellant prior to injection into the combustion chamber with gases produced in gas generator 51. By opening valves 49 and 50, a portion of the hydrazine and nitrogen tetroxide are channeled into gas generator 51 where gaseous combustion products are formed. These gases then pass into feed lines 15 and 16 via aeration lines 56 and 57 by opening valves 52 and 53. By selectively changing the orifice area of valves 52 and 53, the quantity of the combustion gases injected into the propellant feed lines 15 and 16 may be controlled to vary the propellant density according to the thrust requirements of the specific maneuver.

In order to effect injection of the combustion product from lines 56 and 57, the pressure in the gas generator 51 must be greater than the pressure of the propellants in feed lines 15 and 16. This may be achieved by any means desirable such as, for example, employing a throttling valve for fuel control valve 19 in order to produce a pressure drop resulting in the necessary pressure differential. Also, to prevent back-flow of combustion products from gas generator 51, it is desirable to employ check valves in lines 54 and 58. In certain instances, valves 52 and 53 may be check valves with the quantity of gas injected into each line 15 and 16 controlled by valves 49 and 50 only.

At the point where the gaseous products are injected into the propellant feed line 15 or 16, it may be desirable to employ gas diffusion means similar to that found in FIG. 2 of the Morrell Patent No. 3,045,424. In the event entrained particles in the combustion products tend to clog the feed lines or injection ports, it will be necessary to provide screen devices upstream of the point of injection.

The temperature of the gaseous combustion products may be varied by altering the ratio of fuel to oxidizer fed into the gas generator 51 by selectively controlling valves 49 and 50. For example, a fuel-rich gaseous combustion product may be produced by admitting additional quantities of fuel through valve 49 whereupon the heat of combustion in gas generator 51 will act to volatilize the excess fuel admitted thereto. In the event the resultant fuel-rich gaseous combustion products react with the oxidant in fuel line 16, it is desirable to use a second gas generator for the production of oxidizer-rich gases.

In FIG. 2, an alternative system using two gas generators, 61 and 71, is diagrammatically shown. According to this system, a low temperature fuel-rich gas may be produced in gas generator 61 by opening valves 62 and 63 to admit excess of fuel into gas generator 61. The combustion products produced thereby are then fed into line 15 by changing the orifice area of valve 64. Similarly, an oxygen-rich low temperature aerating gas may be produced by opening valves 72 and 73 to admit an excess of oxidant. The resultant oxidant-rich gas is then injected into oxidant fuel line 16 by opening control or check valve 74 whereupon the desired aeration is effected.

In either of the systems described above, it may be necessary to employ check valves 65 and 66 in the precombustion feed lines to insure that no propellant flows back into the main feed lines 15 and 16 because of excessive pressures created in the gas generators 61 and 71.

Although the systems described herein and above are primarily intended for propelled throttling, it is also apparent that they may be used to control propellant mixture ratio. For example, in using the system set forth in FIG. 1, it may be desirable to produce a propellant mixture ratio having excess fuel. This may be effected by opening valve 53 to a greater degree than valve 52 whereby the liquid oxidant flowing through line 16 will have entrained gaseous combustion product to a higher degree than the corresponding liquid fuel in line 15.

It is apparent that the above described systems can employ a wide variety of liquid fuel and oxidants to effect the desired results. It is not necessary that the fuel and oxidant used in these systems be hypergolic since ignition devices may be employed in gas generator 51 and combustion chamber 12. In addition, the fuel and oxidant source for the gas generator 51 need not necessarily be the same as the fuel and oxidant found in tanks 17 and 18; instead individual tanks containing appropriate fuel and oxidant may be used in order to completely decouple the propellant sources.

Such a system is shown in FIG. 3 wherein separate storage tanks 75 and 76 are provided for fuel and oxidant to be used in the gas generator 51. Such a system is necessary where the main propellants found in tanks 17 and 18 produce gaseous combustion products containing substantial quantities of entrained particles which would tend to clog the feed lines of the system or the injection ports found in injector 13. By providing tanks 75 and 76 with a fuel and oxidant which are relatively clean burning, the problem of filtering entrained particles found in the combustion products in order to avoid clogging of the system is substantially mitigated. An example of appropriate fuel and oxidant for a clean burning system would be hydrazine and nitrogen tetroxide as a fuel and an oxidant respectively.

It is readily apparent from the foregoing description of exemplary systems employing the principles of the instant invention that the use of a small quantity of propellant for purposes of precombustion in a gas generator such as 51 will markedly reduce the thrust level of the reaction motor. Consequently, the above described systems do not impose excessive weight or bulk problems on the propulsion vehicle nor are large quantities of the main propellant called upon to perform the auxiliary function of aeration. Because the quantity of gaseous combustion products which may be injected as fine bubbles into the propellant streams can be varied in a continuous manner, the thrust levels between no aeration and maximum aeration are continuously variable. By selecting suitable propellants, the system characteristics, in so far as controllability, range of thrust level, specific impulse, and total impulse, may be modified to meet the demands of the particular mission. The individual propellants utilized may be comprised of a mixture of oxidants or fuels which may take any physical state or chemical composition suitable to achieve the desired effects. It is also apparent that the above described systems may be employed in hybrid reaction motors or in mono-propellant systems.

Obviously, many modifications and variations of the present invention are possible in light of the above teaching. The structural systems described for carrying out the method of the present invention are merely exemplary and many alternative structural forms may be employed for the practice of the instant invention. It is, therefore, to be understood that, within the scope of the appended claims, the invention may be practiced otherwise than as specifically described.

Having thus described the invention, what is claimed is:

1. A method for selectively modulating the thrust of a reaction motor comprising flowing a liquid propellant to a point for combustion, generating gaseous combustion products, injecting a predetermined quantity of said gaseous combustion products into the liquid propellant upstream of said point for combustion and downstream of the propellant supply tank whereby the bulk density of said liquid propellant is lowered, combusting said liquid propellant of lowered bulk density in the reaction motor whereby the thrust output is lowered to a predetermined level.

2. A method for modulating the thrust of a reaction motor comprising flowing a liquid propellant, diverting part of the flow of said propellant into a gas generator; combusting said diverted portion of the propellant with a reactive material to produce gaseous combustion products; conducting said gaseous combustion products into the flowing liquid propellant downstream of the point of the diversion whereby the liquid propellant is aerated with the gaseous combustion products to reduce the bulk density of said liquid propellant; and combusting the aerated liquid propellant in a reaction motor.

3. A method for modulating the thrust of a reaction motor comprising flowing a liquid propellant along a primary and secondary stream; reacting the secondary stream to form gaseous combustion products; injecting a predetermined quantity of the gaseous combustion products into the primary propellant stream and combusting the mixture of the primary stream and the combustion products in a combustion chamber; whereby the primary stream of reduced bulk density lowers the thrust capability of the reaction motor on injection into the combustion chamber.

4. A reaction motor comprised of a thrust chamber, means for storing a liquid propellant, means for flowing said liquid propellant to said thrust chamber, means for generating a supply of gaseous combustion products, and means for selectively injecting said gaseous combustion products into said means for flowing the liquid propellant at a point downstream of said means for storing the liquid propellant.

5. A reaction motor comprised of a thrust chamber, means for storing a liquid fuel, means for flowing said liquid fuel to said thrust chamber, means for storing a liquid oxidant, means for flowing said liquid oxidant to said thrust chamber, first means for pre-combustion of a predetermined quantity of said liquid fuel and liquid oxidant whereby gaseous combustion products are produced, second means for pre-combustion of a predetermined quantity of said liquid fuel and liquid oxidant whereby combustion products are produced, means for selectively injecting the combustion products from said first means for pre-combustion into said means for flowing said liquid fuel, and means for selectively injecting the combustion products from said second means for pre-combustion into said means for flowing said liquid oxidant.

6. A reaction motor comprised of a thrust chamber, means for storing a primary liquid fuel, means for flowing said primary liquid fuel to said thrust chamber, means for storing a primary liquid oxidant, means for flowing said primary liquid oxidant to said thrust chamber, means for storing a secondary liquid fuel, means for storing a secondary liquid oxidant, means for reacting said secondary liquid fuel and secondary liquid oxidant to form gaseous combustion products, and means for selectively injecting predetermined quantities of said gaseous combustion products into at least one of said means for flowing said primary fuel and primary oxidant.

References Cited by the Examiner

UNITED STATES PATENTS

| | | | |
|---|---|---|---|
| 2,408,111 | 9/1946 | Truax et al. | 60—35.6 |
| 2,683,963 | 7/1954 | Chandler | 60—35.6 |
| 3,040,520 | 6/1962 | Rae | 60—35.6 |
| 3,045,424 | 7/1962 | Morrell | 60—35.6 |

MARK M. NEWMAN, *Primary Examiner.*

ABRAM BLUM, SAMUEL LEVINE, *Examiners.*

S. N. GARBER, D. HART, *Assistant Examiners.*